United States Patent [19]

McClintock

[11] 3,734,111

[45] May 22, 1973

[54] APPARATUS FOR IN-LINE MIXING OF FLUIDS

[75] Inventor: William A. McClintock, Bartlesville, Okla.

[73] Assignee: Phillips Petroleum Company, Bartlesville, Okla.

[22] Filed: Dec. 20, 1971

[21] Appl. No.: 209,575

[52] U.S. Cl. ......................... 137/3, 137/604, 261/113
[51] Int. Cl. ............................................. G05d 11/02
[58] Field of Search ......................... 137/3, 597, 604; 239/429, 430, 432, 504; 261/62, 76, 108, 109, 113

[56] References Cited

UNITED STATES PATENTS

| | | | |
|---|---|---|---|
| 2,484,205 | 10/1949 | Candlel | 261/113 X |
| 2,774,583 | 12/1956 | Haftke | 261/76 |
| 3,544,086 | 12/1970 | Willett | 261/62 |
| 3,363,843 | 1/1968 | Ballard et al. | 239/504 |

*Primary Examiner*—William R. Cline
*Attorney*—Donald J. Guigg et al.

[57] ABSTRACT

A method and apparatus are provided for mixing a fluid traveling in a pipe section with a second fluid introduced into the pipe section by sparging the second fluid into the pipe section at points across the internal diameter of the pipe section, disrupting the flow through the pipe section with a perforated frusto-conical baffle coaxially aligned with the pipe section with its apex extending toward the means of sparging the second fluid, sparging additional second fluid downstream from within the throat of the frusto-conical baffle, and disrupting the flow within the pipe downstream of the frusto-conical baffle and sparging means with a line restriction extending from the pipe section sidewalls into the pipe section to create an orifice of smaller diameter than the pipe section inside diameter coaxially aligned with the pipe section.

6 Claims, 4 Drawing Figures

PATENTED MAY 22 1973 3,734,111

INVENTOR.
W. A. McCLINTOCK

BY *Quigg & Oberlin*

ATTORNEYS

APPARATUS FOR IN-LINE MIXING OF FLUIDS

BACKGROUND OF THE INVENTION

This invention relates to an apparatus and method for intimately comingling two fluid streams. In one of its aspects, this invention relates to comingling two fluid streams flowing in a pipe section. In another of its aspects, this invention relates to the sparging of a second fluid stream into a first fluid stream flowing in a pipe section. In yet another of its aspects, this invention relates to the effects of baffles in comingling fluids flowing in a pipe section.

The concept of this invention is concerned with the relationship of sparging and baffling means to mix more intimately a fluid introduced into a pipe section with another fluid already flowing in the pipe section.

In most chemical reaction processes the reaction rate and degree of completion of reaction can be improved by more intimate mixing of the reactants. One means of mixing reactants is to introduce a fluid into a pipe section within which another reactant stream is flowing. Various combinations of sparger and baffle arrangements can be proposed offering varying degrees of mixing of reactants.

I have discovered a combination of sparging heads and baffles which lead to an apparatus and method yielding improved mixing of a fluid component introduced into a pipe section within which another fluid reactant is flowing.

It is an object of this invention to produce an apparatus for the intimate mixing of a fluid flowing in a pipe section with a fluid introduced into the pipe section through a sparger.

It is another object of this invention to produce a method for mixing two fluids flowing in a pipe section. It is another object of this invention to increase the efficiency of chemical reactions by providing more intimate mixing of the reactants in a pipe line leading to the reactor.

SUMMARY OF THE INVENTION

An apparatus is provided for mixing a first fluid with a second fluid stream flowing in a pipe section. The apparatus comprises an elongated sparging means extending into the pipe section across the internal diameter with perforations in the sparging means to emit a flow of sparged first fluid at points across the internal diameter of the pipe section. The elongated sparging means has on the downstream side, aligned coaxially with the pipe section, a teed portion perforated to emit a flow of sparged fluid. Surrounding the teed portion of the sparger is a perforated frusto-conical baffle coaxially aligned with the pipe section with its apex extending toward the elongated sparging means. Downstream of this baffle a restriction plate extends round the pipe section interior to form an orifice coaxially aligned with the pipe which sufficiently restricts the flow along the pipe wall to disrupt the pattern of flow in the pipe section.

A method of mixing a fluid flowing in a pipe section with fluids sparged into the pipe section is also provided in which a fluid is sparged laterally from a sparger extending across the internal diameter of a pipe section through which another fluid is flowing. These fluids flow onto a perforated frusto-conical baffle coaxially aligned with the pipe section with its apex extending toward the sparging means so that the fluids are intimately mixed flowing around the baffle and through the perforations in this baffle. Additional fluid is sparged through a teed section of the sparger line into the downstream throat of the frusto-conical baffle. This fluid is intimately mixed with the fluid flowing through the perforations in the frusto-conical baffle and around the frusto-conical baffle the flow of which is disrupted by the restriction extending into the pipe section from the pipe wall.

The invention can best be understood with reference to the drawing,

FIG. 1 of which illustrates the relationship of the sparging means and baffle means of this invention.

Figure 1:
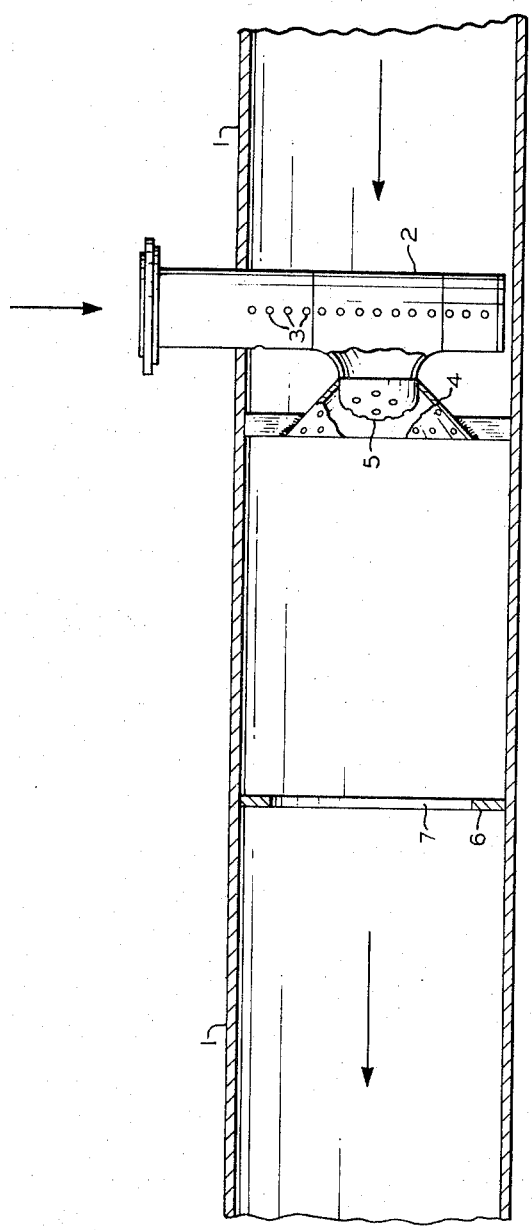
Figure 4:
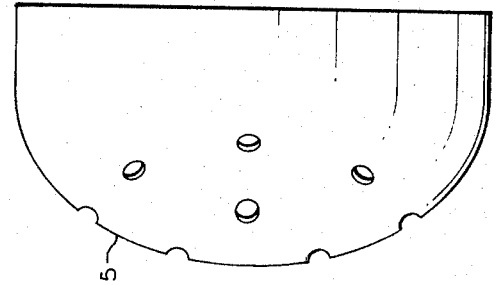
FIG. 3 and FIG. 4 are details of a sparging cap teed within the frusto-conical baffle.
Figure 3:
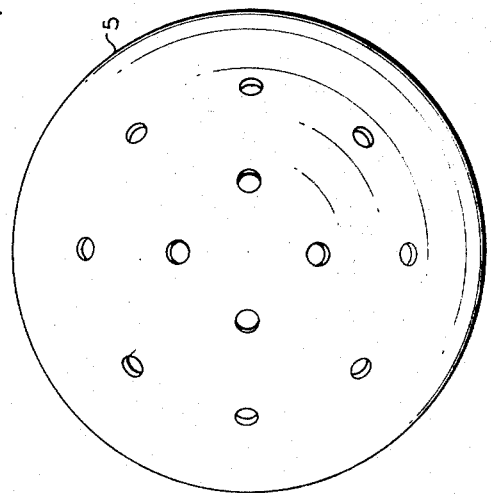
Figure 2:
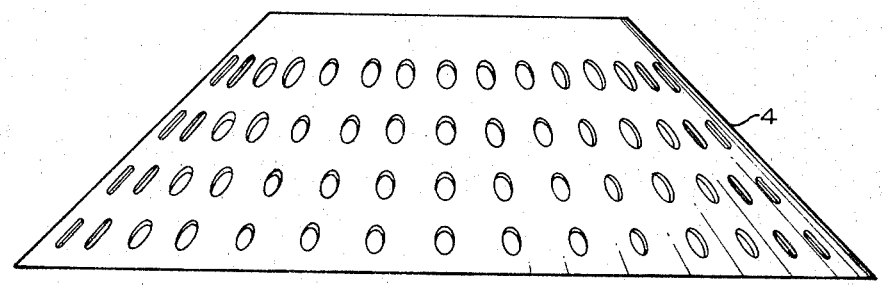
FIG. 2 is a detail of a perforated frusto-conical baffle.

Referring now to the drawing in FIG. 1, a fluid is flowing within pipe section 1. Another fluid is sparged into the perforated, elongated sparger 2 to be emitted through holes 3 perpendicular to the flow of fluid in the pipe section. The flow of fluid in the pipe and the sparged fluid is disrupted by a frusto-conical baffle 4 which is perforated to permit the flow of some fluid through the baffle. Additional fluid is sparged through the perforated cap 5 which is located within the throat of the frusto-conical baffle, coaxial with the pipe section and teed into the downstream side of the elongated sparger 2. Fluid flowing through the perforations in the frusto-conical baffle 4 and from the sparger cap 5 are intimately mixed in the disrupted flow produced by the fluid flowing around the frusto-conical baffle close to the pipe walls which flow is disrupted by the restriction 6 which extends from the pipe section side walls into the pipe section to form an orifice 7 which is coaxial with the pipe section and which has a diameter less than the diameter of the pipe section. The intimately mixed fluids flow through a straight section of pipe downstream of orifice 7 to be directed into a reactor.

The apparatus and method of this invention are suitable for mixing any combination of fluids which can be flowed through a pipe section and sparged into the pipe section. It is equally adaptable to liquid-liquid, vapor-vapor, liquid-vapor combinations.

The elongated sparger extends across the diameter of the pipe section and can touch the wall of the pipe section opposite its entry point or can be sufficiently removed from that wall to allow for perforation of the capped end of the sparger to continue the line of sparged holes all the way around the sparger including the capped end. Location of the sparger holes is on a line down each side of the sparger, and in one embodiment around the capped end, to emit sparged fluid perpendicular to the flow of fluid in the pipe section. The size of this sparger pipe should be no more than one-third the nominal diameter of the pipe section into which it is inserted. At present a sparger pipe having a diameter one-fourth the diameter of the pipe section into which it is inserted is preferred.

The frusto-conical baffle has been found to be effective with an angle of the cone of 30° to 60°. At present an angle of 45° is preferred. Size and placement of perforations in the cone will depend on the physical characteristics of the fluids being mixed. At present this is not deemed critical. The cone can be attached to a nipple extending up to 10 pipe diameters of the sparger pipe in distance from the sparger pipe. At present immediate attachment to a tee on the sparger pipe is preferred.

The perforated sparger cap within the frusto-conical baffle will preferably be of the same size as the diameter of the sparger pipe. The number and size of the perforations in this cap are determined by the balance of flow desired between this cap and the elongated sparger holes.

The distance from the downstream end of the perforated cone to the orifice restricting flow in the pipe section can vary from one to five diameters of the pipe section through which fluids are flowing. A distance greater than five pipe diameters will not sufficiently disrupt the flow in the pipe section to produce intimate mixture of the fluids.

EXAMPLE I

A mixing system here denominated A, not of the present invention, was installed in a 24 inch nominal diameter pipe. This mixing system consisted of a 6 inch pipe without perforations elbowing into a perforated cup surrounded by a 45° perforated frusto-conical baffle coaxially aligned in the 24 inch pipe with the bell of the baffle containing the perforated cup pointing downstream. Two and one-half feet downstream from the open bell of the baffle was a mixing orifice coaxially aligned with the pipe section having a 1 foot 5¼ inch orifice port.

EXAMPLE II

A mixing system in accordance with this invention was installed in a 24 inch nominal diameter pipe. The elements of this mixing system were the same as that denominated condition A except that the elbow on the 6 inch sparger pipe was replaced with a tee, the sparger pipe was extended to within two inches of the side wall of the 24 inch pipe opposite the inlet side and three-eighth inch diameter perforations on 1½ inch centers were extended down both sides and around the end of the sparger pipe to emit a flow perpendicular to the fluid flow in the pipe. This mixing system is denominated condition B.

EXAMPLE III

Each of the mixing systems above, condition A and condition B, were installed as inlet mixers for sparging butene feed into a steam air mixture passing to an oxidative dehydrogenation reactor for the production of butadiene. Conditions and results of the test are presented below.

|  | Condition A | Condition B |
|---|---|---|
| Catalyst age, days | 21 | 21 |
| Feed purity, mol % | 94.24 | 95.62 |
| Conversion %, gas phase | 75.19 | 75.74 |
| Selectivity %, gas phase | 91.47 | 93.64 |
| Ton butadiene per day, gas phase | 133.13 | 138.88 |
| Butene feed, MSCFH | 120 | 120 |
| Air feed, MSCFH | 536 | 575 |
| Steam feed, M lb/hr | 165 | 171 |
| Steam/butene mol ratio | 30.67 | 31.35 |
| Air/butene mol ratio | 4.74 | 5.02 |
| Residence time, seconds* | .59 | .60 |
| Reactor inlet temp., °F | 873 | 897 |
| Reactor outlet temp., °F | 1129 | 1123 |
| Reactor pressure drop, psi | 1.6 | 1.6 |
| Oxygen in reactor effluent, mol % | 6.3 | 6.3 |

*Res. time = $\dfrac{\text{operating press. (p.s.i.a.)} \times 3600}{14.7 \text{ (standard atmos. press.)}} \times \dfrac{\text{cu. ft. of catalyst}}{\text{standard cu. ft./hr. of gas}}$ As shown in the table above, with the butene feed the same, the butadiene production per day is increased by condition B mixing to 104 percent of the production using condition A mixing. This illustrates the practical consequence of the better mixing of this invention.

I claim:

1. An apparatus for mixing a first fluid stream with a second fluid stream being carried in a pipe section said apparatus comprising:
   a. an elongated sparging pipe means extending into said pipe section across the internal diameter of said pipe section, said sparging pipe means perforated to emit a flow of sparged fluid at points spaced across the internal diameter of the pipe section, said elongated sparging pipe means also having on the downstream side, aligned coaxially with the pipe section, a teed portion perforated to emit a flow of sparged fluid,
   b. a perforated frusto-conical baffle means surrounding said teed portion, said baffle means coaxially aligned with the pipe section with the apex of the baffle extending toward said elongated sparging means, and
   c. downstream of the baffle a restriction extending around the pipe section interior sufficiently restricting flow along the pipe wall to disrupt the pattern of flow in the pipe section.

2. The apparatus of claim 1 wherein the elongated sparging pipe means is perforated to emit a flow of sparged first fluid perpendicular to the flow of the fluid flowing within the pipe section.

3. The apparatus of claim 1 wherein the frusto-conical baffle has an angle of the cone of 30° to 60°, the cone is attached to a nipple up to 10 pipe diameters of the sparger pipe in distance from the sparger pipe, and the distance from the downstream end of the perforated cone to the restricting orifice is from one to five diameters of the pipe section through which the fluids are flowing.

4. The apparatus of claim 3 wherein the angle of the cone of the frusto-conical baffle is 45° and the base of the cone is immediately attached to the elongated sparger pipe.

5. The apparatus of claim 4 for mixing sparged butene feed with a steam-air mixture passing through a nominal 24 inch pipe section wherein the sprager pipe is a nominal 6 inch pipe section and the restriction is a 1 foot 5¼ inch orifice port located 2½ feet downstream from the open bell of the frusto-conical baffle.

6. A method for mixing a first fluid with a second fluid stream being carried in a pipe section, said method comprising:
   a. sparging said first fluid into said second fluid at points across the internal diameter of the pipe section perpendicular to the second fluid flowing in the pipe section,
   b. interrupting the flow of said first and second fluids with a perforated frusto-conical baffle means coaxially aligned with the pipe section with the apex extending toward means for sparging the first liquid into the pipe section,
   c. introducing additional sparged first fluid downstream within the bell of the frusto-conical baffle means and
   d. interrupting the fluid flow within the pipe section by means of restrictive orifice downstream of the bell of the frusto-conical baffle means.

* * * * *